(12) United States Patent
Martin-Woodin et al.

(10) Patent No.: US 7,078,630 B2
(45) Date of Patent: Jul. 18, 2006

(54) WEIGHT MEASUREMENT AND SUPPORT APPARATUS FOR A HUMAN AND METHOD OF USE

(75) Inventors: Audrey Kay Martin-Woodin, Federal Way, WA (US); Darrell James Shelton, Renton, WA (US)

(73) Assignee: Innovative Assistive Technology, Inc., Federal Way, WA (US)

(*) Notice: Subject to any disclaimer, the term of this patent is extended or adjusted under 35 U.S.C. 154(b) by 143 days.

(21) Appl. No.: 10/778,412

(22) Filed: Feb. 13, 2004

(65) Prior Publication Data

US 2005/0178590 A1    Aug. 18, 2005

(51) Int. Cl.
G01G 19/52 (2006.01)
(52) U.S. Cl. .................. 177/144; 4/480; 280/250.1
(58) Field of Classification Search ............ 4/237, 4/480; 177/144; 280/250.1
See application file for complete search history.

(56) References Cited

U.S. PATENT DOCUMENTS

| | | | | |
|---|---|---|---|---|
| 604,558 A * | 5/1898 | Cope | ............................. | 4/237 |
| 2,057,024 A * | 10/1936 | Gunnison | .................... | 177/144 |
| 2,869,614 A * | 1/1959 | Wamsley | ..................... | 280/230 |
| 2,899,698 A * | 8/1959 | Pastl | .......................... | 15/244.1 |
| 3,061,368 A * | 10/1962 | Matthews | ................... | 297/118 |
| 3,062,582 A * | 11/1962 | Baldwin | ..................... | 297/118 |
| 3,215,469 A * | 11/1965 | Wamsley | ............... | 297/344.18 |
| 3,271,785 A * | 9/1966 | Du Bose | ....................... | 4/480 |
| 3,611,449 A * | 10/1971 | Berry | ............................. | 4/480 |
| 3,630,299 A * | 12/1971 | Albagli | ........................ | 177/145 |
| 3,732,938 A * | 5/1973 | Nelson | ........................ | 177/126 |
| 3,769,638 A * | 11/1973 | Clanan | .......................... | 4/237 |
| 4,013,135 A * | 3/1977 | Kechely | ..................... | 177/144 |
| 4,177,528 A * | 12/1979 | James | ............................ | 4/239 |
| 4,697,656 A * | 10/1987 | de Canecaude | ............. | 177/144 |
| 4,799,562 A | 1/1989 | Burrows et al. | ............. | 177/229 |
| 5,077,845 A * | 1/1992 | Tokunaga et al. | .............. | 5/605 |
| 5,197,152 A * | 3/1993 | Rose et al. | ..................... | 4/479 |
| 5,373,591 A * | 12/1994 | Myers | ........................ | 4/560.1 |
| 5,414,225 A * | 5/1995 | Garfinkle | ..................... | 177/199 |
| 5,448,022 A * | 9/1995 | Rishel | ......................... | 177/126 |
| 5,557,753 A * | 9/1996 | Suenaga et al. | ............. | 710/107 |
| 5,570,301 A | 10/1996 | Barrus | ........................ | 702/150 |
| 5,608,925 A * | 3/1997 | Porter | ........................... | 4/480 |
| 5,966,750 A * | 10/1999 | Polanco | .......................... | 4/480 |
| 5,996,150 A * | 12/1999 | Blevins et al. | ................. | 5/613 |
| 6,225,575 B1 * | 5/2001 | Hoyland | ..................... | 177/144 |
| 6,354,996 B1 * | 3/2002 | Drinan et al. | ............... | 600/300 |
| 6,403,897 B1 * | 6/2002 | Bluth et al. | ................. | 177/144 |
| 6,416,070 B1 * | 7/2002 | Lin | .......................... | 280/250.1 |
| 6,539,558 B1 * | 4/2003 | Shero | ........................... | 4/480 |
| 6,547,265 B1 * | 4/2003 | Enge et al. | .............. | 280/47.38 |
| 6,623,022 B1 * | 9/2003 | Malassigne et al. | ..... | 280/250.1 |
| 6,825,425 B1 * | 11/2004 | Perry | .......................... | 177/126 |

(Continued)

FOREIGN PATENT DOCUMENTS

CH         688843 A5 *    4/1998

(Continued)

Primary Examiner—Randy W. Gibson
(74) Attorney, Agent, or Firm—Peloquin, PLLC; Mark S. Peloquin, Esq.

(57) ABSTRACT

An apparatus includes a support surface for a human. The support surface has a lower portion and a back portion, with an aperture formed therein. A weight measurement device is coupled with the support surface, such that when a human is supported by the support surface the human's perineum is positioned over the aperture and the human's weight can be measured by the weight measurement device.

45 Claims, 9 Drawing Sheets

U.S. PATENT DOCUMENTS 6,875,932 B1 * 4/2005 Tuft .................. 177/25.13
2002/0024196 A1 * 2/2002 Malassigne et al.

FOREIGN PATENT DOCUMENTS

| EP | 1189042 A1 * | 3/2002 | |
|---|---|---|---|
| FR | 2561898 A1 * | 10/1985 | |
| FR | 2576509 A2 * | 8/1986 | |
| FR | 2583973 A2 * | 1/1987 | |
| FR | 2586923 A2 * | 3/1987 | |
| FR | WO 8807176 A1 * | 9/1988 | .................. 177/211 |
| JP | 2000-83866 A * | 3/2000 | |
| JP | 2000-126080 A * | 5/2000 | |
| JP | 2000-210229 A * | 8/2000 | |
| JP | 2000-225101 A * | 8/2000 | |
| WO | PCT/US2005/004581 | 7/2005 | |

* cited by examiner

WEIGHT MEASUREMENT AND SUPPORT APPARATUS FOR A HUMAN AND METHOD OF USE

BACKGROUND OF THE INVENTION

1. Field of Invention

The invention relates generally to health care devices, and more specifically to apparatuses and methods used to support and to weigh a human while facilitating human waste discharge cleansing or visual inspection of the perineal area of the human body.

2. Art Background

Invalids and mobility-impaired people, hereinafter the mobility-impaired, suffer from an inability to use existing scales, shower, and toilet facilities. Existing scales, used to measure body weight generally require a user to step onto the scale or to sit on a chair in order for the device to perform a body weight measurement. Scales and toilet facilities are designed primarily for independent use by non-mobility-impaired people. Typically, a mobility-impaired person cannot move onto a scale without assistance. The mobility-impaired person usually receives assistance from health care providers in order to use existing scales and toilet facilities. Health care providers accomplish these tasks by moving the mobility-impaired person onto a plurality of existing devices.

A simple task such as wiping a mobility-impaired person clean after discharging waste can require the mobility-impaired person to be tilted uncomfortably forward, to stand in an awkward position, or to be lifted to a bed; thereby, creating additional problems for both the mobility-impaired person as well as the health care worker administering aid. To obtain a weight measurement, the mobility-impaired person is moved to a scale to obtain a measure of body weight. Due to the costs associated with moving a mobility-impaired person from one device to another it is conceivable that the level of health care rendered to a mobility-impaired person is less than desirable due to the expense of having to engage the services of health care workers to perform the tasks of measuring weight and cleaning the perineal and lower spine areas after discharging waste.

A person's body weight fluctuates during the course of the day due to food consumption and waste discharge. As described above, due to the lack of self-mobility, on the part of the mobility-impaired person, weight measurements cost money and expose the health care worker to risk of injury during patient movement on and off of existing measurement devices. These circumstances may combine to predispose the mobility-impaired person from receiving frequent weight measurements that are needed to properly monitor the state of health of a mobility-impaired person.

Mobility-impaired individuals need to have their perineal and lower spinal areas frequently inspected by health care workers for medical reasons. Chief among these medical reasons is inspection of the coccyx (tailbone), sacral and lower spine areas for pressure sores known as Decubitus Ulcers. A Decubitus Ulcer can range from a very mild pink coloration of the skin, which disappears in a few hours after pressure is relieved on the area, to a deep wound extending to and sometimes through internal organs and into bone. The primary treatment regimen for Decubitus Ulcers is prevention through frequent inspection and physical relief through repositioning the mobility-impaired, eliminating pressure and increasing circulation to the affected area. Early, visual detection of pressure sores is central to reducing serious infection; inspection should occur frequently. These wounds occur frequently among the mobility-impaired and are of grave concern. Health care providers go through a cumbersome process of moving a mobility-impaired person to a bed to perform a simple inspection. Health care facilities that fail to provide routine inspections could be considered negligent and risk exposure to liability.

There exists a need to relieve the pressure that causes Decubitus Ulcers. Mobility-impaired people, because of their disabilities, find it difficult to sense points of excessive and prolonged pressure on their bodies. Particularly sensitive areas are the coccyx, sacral, and lower back regions of the skeleton. Prolonged pressure to these areas may lead to skin lesions, open sores, and infection. The key factor in healing Decubitus Ulcers in the early stage is alleviating pressure on the sore area to prevent it from worsening. Shearing or rubbing occurs on the coccyx and sacral area whenever there is friction on the surface of the skin imparted from another surface, be it clothing or a wheel chair seat surface. The combined problems that arise from the existing devices, of pressure imparted to the perineal and lower spinal areas and the dampness resulting from waste deposits can accelerate the formation of Decubitus Ulcers.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements. In the drawings.

DETAILED DESCRIPTION

In the following detailed description of embodiments of the invention, reference is made to the accompanying drawings, in which like references indicate similar elements, and in which is shown by way of illustration, specific embodiments in which the invention may be practiced. These embodiments are described in sufficient detail to enable those of ordinary skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

An integrated weight measurement device and support surface for a mobility-impaired person (human) is disclosed which permits weight measurement, while simultaneously changing and/or eliminating pressure on the coccyx, sacral, and lower back regions of the human's anatomy. Eliminating pressure on these areas of the anatomy mitigates the problems of Decubitus Ulcer formation previously described. In one embodiment, the support surface eliminates pressure on part of the mobility-impaired person's (human's) anatomy and allows posterior access to the mobility-impaired person (human) when the human is supported on the support surface. Posterior access to the human, and elimination of undesired pressure are provided through an aperture in the support surface. Access to the perineal area of the human facilitates cleaning of the human's perineal and lower spinal area following waste discharge by a health care worker without having to move the human.

Weight measurements, obtained by the integrated weight measurement device, allow the mobility-impaired person's weight to be measured without necessitating the transfer of the mobility-impaired person to a separate weight measurement device. Additionally, inspection of the perineal and lower spinal areas of the human are provided through the aperture in the support surface. Medical treatment can be rendered through the aperture in the support surface. Medication can be administered and/or manipulation of the perineal and lower spinal areas can be effected through the aperture.

In the description that follows, reference will be made to the human who will be supported by support surfaces in the embodiments of the invention described herein. It will be understood by those of ordinary skill in the art that the human is not shown in the accompanying drawings so that the invention is not obscured.

Figure 1:
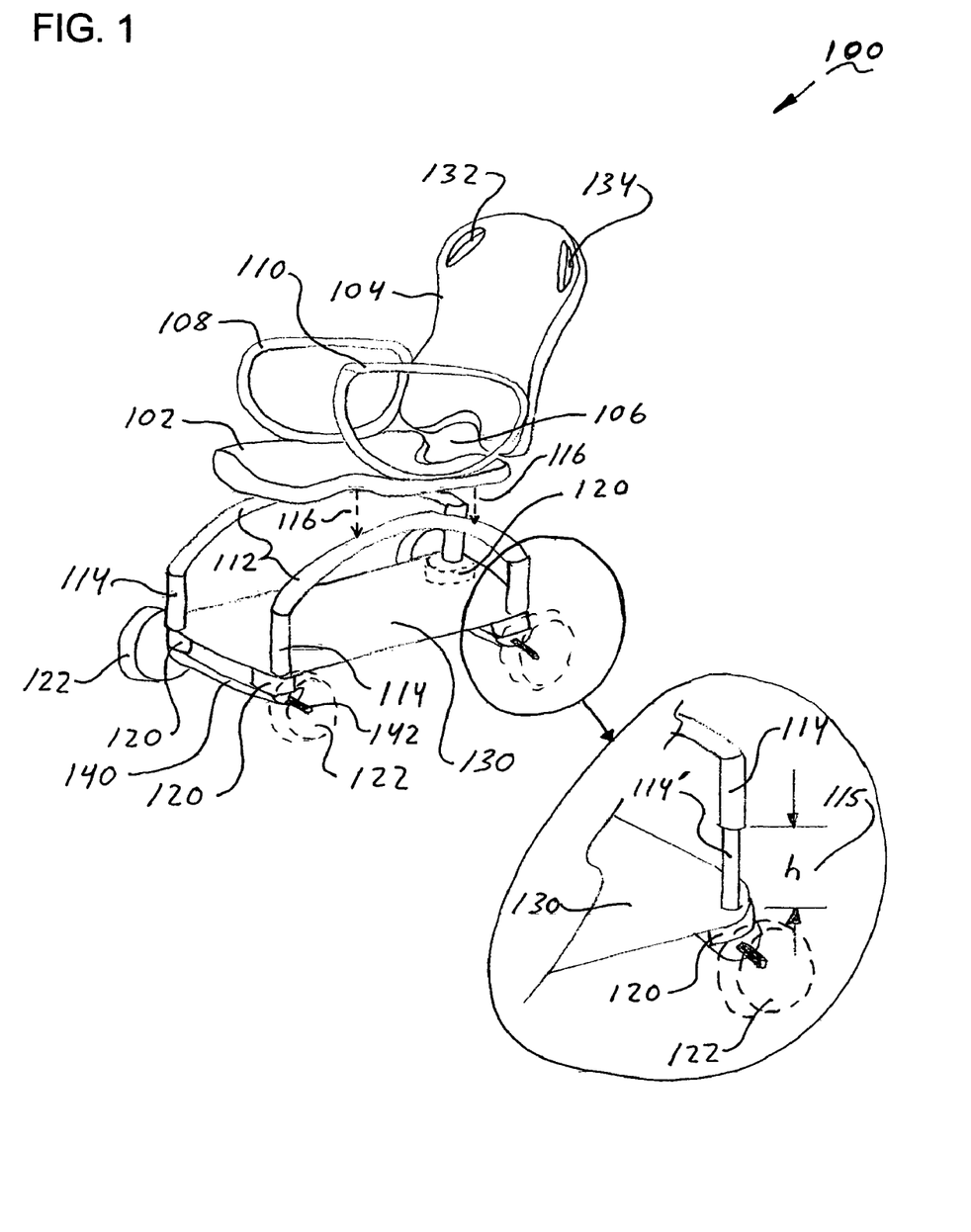
FIG. 1 illustrates one embodiment of the invention showing an integrated weight measurement device and a support surface.

FIG. 1 illustrates one embodiment of the invention showing an integrated weight measurement device and a support surface. With reference to FIG. 1, an integrated weight measurement device and support surface for use by a human is shown generally at 100. The support surface includes a lower portion 102 and a back portion 104. An aperture 106 is formed in the support surface and is positioned such that when a human is seated on the support surface, the human's perineum is positioned over the aperture 106. A waste receptacle (not shown) can be placed beneath the aperture 106 to receive waste from the human. Medical services can be administered to the human supported on the support surface utilizing the posterior access afforded by the support surface. Lower portion 102 connects with a frame 112 as indicated by arrows 116. The connection between the lower portion 102 and the frame 112 can be accomplished in various ways, as is known to those of skill in the art, such as, but not limited to, using a rigid connection, a flexible connection, and a removable connection. In one embodiment, support surfaces of different sizes can be interchangeably mounted onto the frame 112 to accommodate different sized humans.

In one embodiment, the width of the lower portion 102 is approximately 480 millimeters at a front end and 460 millimeters wide at a rear end, where the rear end is in the vicinity of the aperture 106. In one embodiment, a length of the lower portion is 450 millimeters. In one embodiment, the back portion has a width of 460 millimeters and a length of 560 millimeters.

According to different embodiments, the shape of aperture 106 can be adjusted and configured for humans of different size. In one embodiment, the aperture 106 can have rounded corners. In one embodiment, a radius of a rounded corner is approximately 70 millimeters. In one embodiment, a length of the aperture 106 is 260 millimeters and a width of the aperture 106 is approximately 150 millimeters.

In various embodiments, the frame 112 can be mounted directly to a base 130 or the frame 112 can be mounted to the base 130 with an intermediate lift assembly 114. The intermediate lift assembly can be configured in a variety of ways, such as, but not limited to, with a telescoping member 114'. The telescoping member 114' can utilize a threaded surface together with a gear where an electric motor is used therein to facilitate extension of 114' and 114; thereby, raising 114 a distance h, indicated by 115 relative to the base 130. In other embodiments, hydraulics can be used to facilitate extension of 114' and 114.

In one embodiment, the support surface is made of a material, such as foam, to present a compliant surface to the human when the human is supported thereon. In one embodiment, the foam is several inches thick. The foam is selected to provide an even pressure distribution to the human seated thereon. The foam can be open cell or closed cell. The foam can be covered with a covering layer such as vinyl, cloth, a woven material, leather or imitation leather, low friction material, etc. In one embodiment, the support surface is made using a composite construction where a structural layer of material is covered with a compliant layer of material to provide a support surface that maintains a shape under load while still presenting a compliant surface to the human. In yet another embodiment, the support surface is constructed with a frame, a cushion layer, and a covering layer. In one embodiment, the frame can be made of metal, such as aluminum or the frame can be made of wood. The cushion layer can be made of open cell foam, closed cell foam or a combination of both and the covering layer can be vinyl, cloth, a woven material, leather or imitation leather, a low friction material, etc.

In one embodiment the support surface is made using a frame to define a shape. The lower portion 102 and the back portion 104 are fastened to the frame and present a compliant surface to the human supported by the support surface.

A measurement device 120 can be configured as a single unit or a plurality of units (as shown) positioned to obtain a weight of the human when the human rests upon the support surface. The measurement device 120 is illustrated in various shapes within FIG. 5 below. In various embodiments, the measurement device 120 can be a mechanical, electrical, or electromechanical design. In conjunction with obtaining a weight of the human on the support surface, a health care worker is able to access the perineal and lower spinal areas of the human following waste discharge without having to move or remove the human from the support surface.

Figure 6:
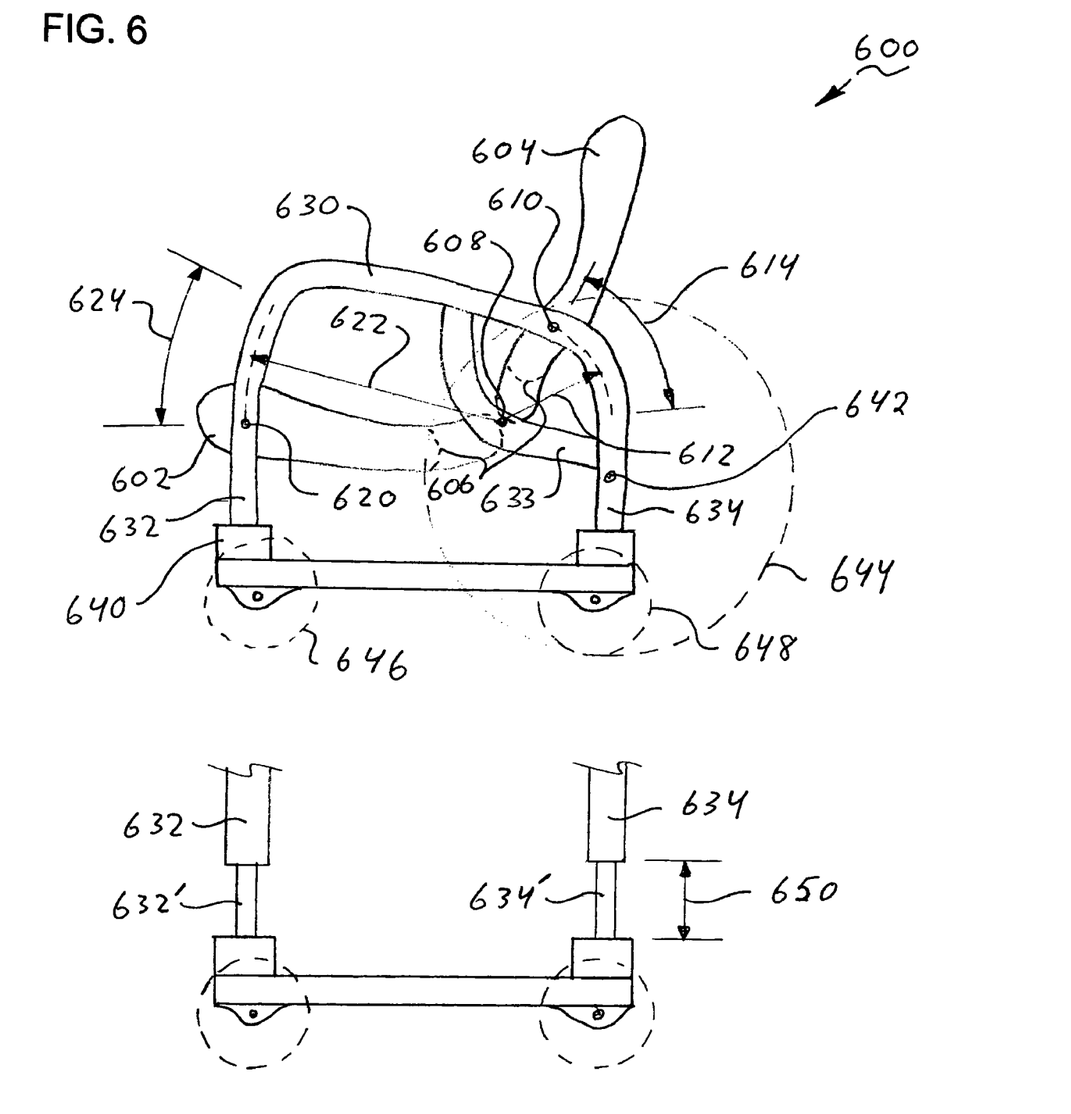
FIG. 6 illustrates support surface adjustment according to one embodiment of the invention.

In one embodiment, mobility can be provided to the support surface by means of wheels 122. Wheels 122 need not all be the same size, for example, in one embodiment, the wheels on the front assembly 140, having axel 142, can have wheels of one size mounted thereon, while the rear wheels can be of another size, as shown in the example of FIG. 6.

In one embodiment, the lower portion 102 is sloped, such that, an elevation of the human's buttocks is less than an elevation of the human's knees when the human is seated on the support surface. Such a slope can also be applied to an arm rest 108 and an arm rest 110 such that an elevation of the human's wrist is greater than an elevation of the human's elbow when the human is seated upon the support surface.

In one embodiment, the slope of the arm rest 108 and 110 is between zero and 10 degrees. In another embodiment, the slope is adjustable. No limitation is implied by this range of slope. The support surface can be configured with arm rests 108 and 110 that can be adjusted to any range that is comfortable for the human seated thereon.

The slope of the lower portion 102 and/or the slope of the arm rests 108 and 110 is used to prevent the human from falling forward when the human is seated thereon and leans forward; this property of the support surface is referred to herein as "capturing" the human or the "capture" ability of the support surface. In one embodiment, the slope of the lower portion 102 is ten degrees. In one or more embodiment, the slope of the lower portion 102 can be variable, and can be adjusted over a range of zero to ten degrees. The support surface is not restricted to a limited range of adjustment; instead the support surface can be configured to provide sufficient elevation difference between the human's knees and buttocks such that the human is prevented from rolling forward and out of the support surface when seated thereon. A foot rest (as shown in figures below) can be configured with the support surface to enhance the "capture" ability of the support surface with respect to the human.

In one or more embodiments, the lower portion 102 can be made with a concave shape with respect to a width and/or length of the lower portion 102. In one or more embodiments, the back portion 104 can be made with a concave shape across a width and/or length of the back portion 104. In one embodiment, the back portion 104 has recesses, 132 and 134, positioned to allow a health care worker to manipulate the support surface, such as when the health care worker lowers the back portion 104, reclines the back portion 104, lifts the support surface or when the health care worker engages in any other manipulation or movement of the support surface. In one embodiment, recesses 132 and 134 are holes that pass through the back portion 104. In another embodiment, only one of the recesses is present. In yet another embodiment, the recess need not pass completely through the support surface.

In one embodiment, the back portion 104 is made with a lumbar support and/or a concave shape to provide an ergonomic shape that is conducive to good posture when the human is supported by the support surface for a long period of time. Being supported by the support surface for a long period of time is common for mobility-impaired people.

The concave shape described above is meant to be given broad interpretation and is not confined to any one particular curve or shape. Concavity is meant to include a departure from a flat plane passing through the lower portion 102 or a flat plane passing through the back portion 104. Concavity can also include a multi-curved surface. The multi-curved surface and/or concave shape is not limited to any particular embodiment, but can be used in any embodiment herein.

Figure 2:
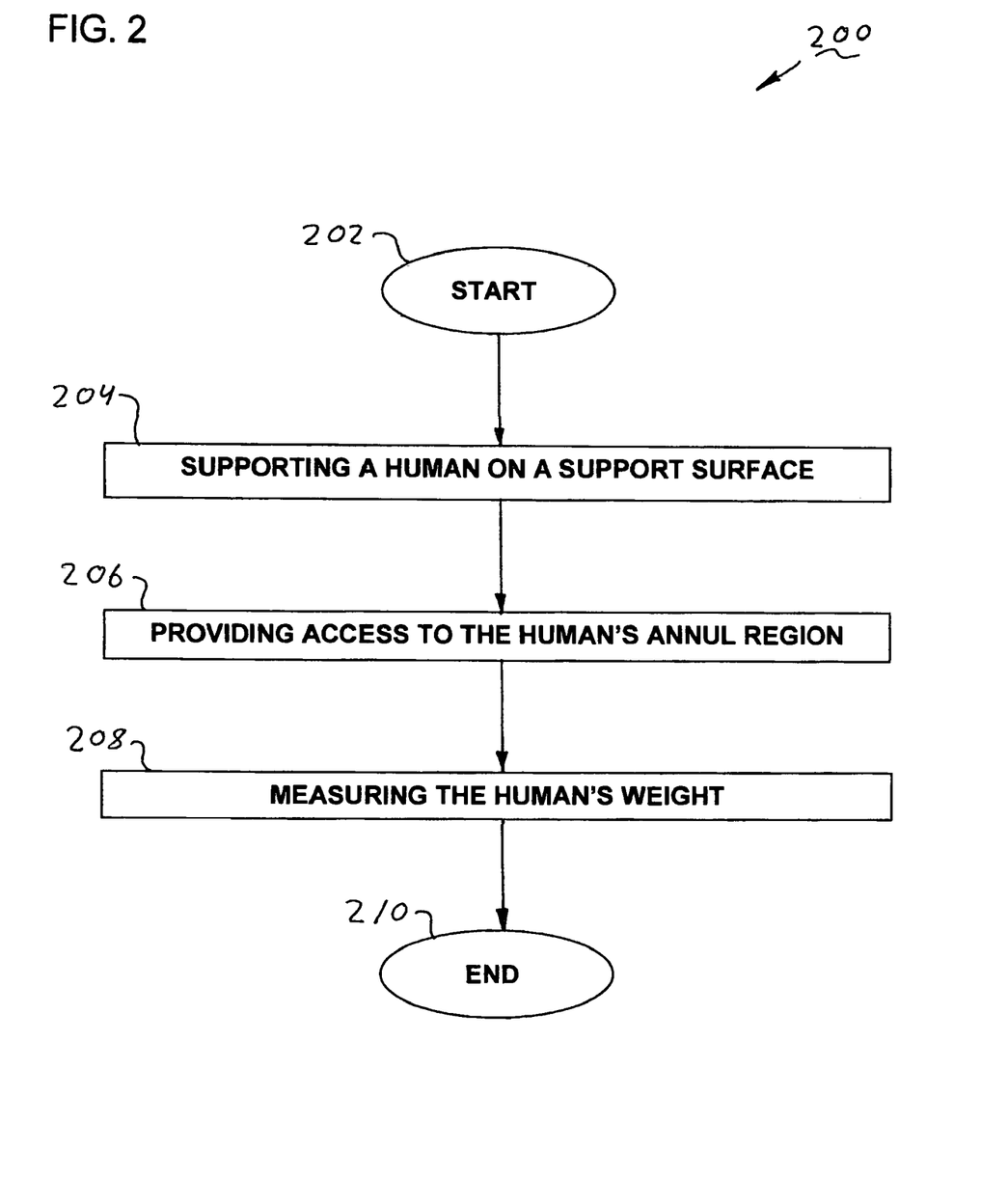
FIG. 2 illustrates a flow chart for using a support surface according to one embodiment of the invention.

FIG. 2 illustrates a flow chart for using a support surface according to one embodiment of the invention. With reference to FIG. 2, the process starts at block 202. A human is supported by a support surface at block 204; in one embodiment, such a support surface is as shown in conjunction with FIG. 1. Access is provided to the human's perineal region through aperture 206. A health care worker can render service to the human through the aperture such as cleaning the human's perineal and/or lower spinal area following waste discharge without the health care worker having to move the human out of the support surface. At block 208 the human's weight is measured while the human is seated on the support surface. The process stops at block 210.

Figure 3:
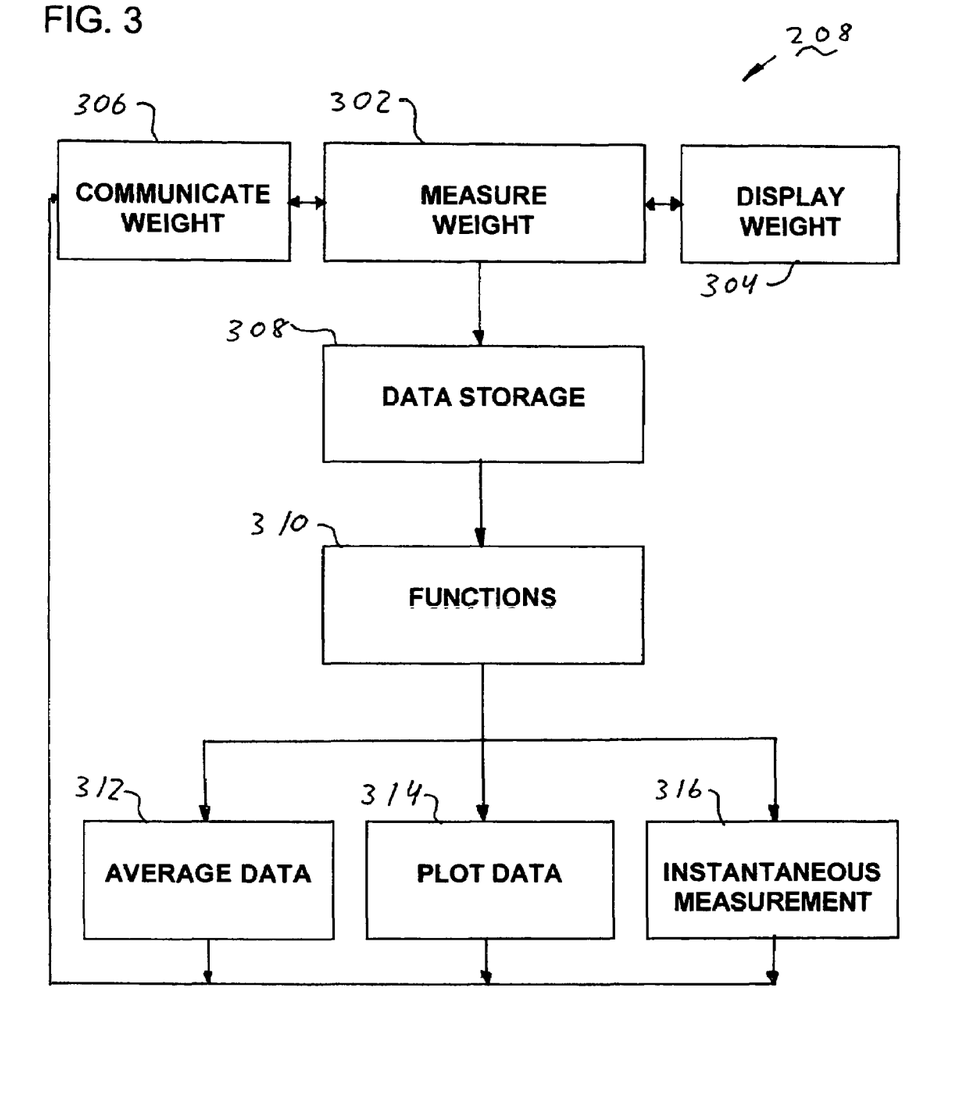
FIG. 3 illustrates a flow chart for weight measurement according to one embodiment of the invention.

FIG. 3 illustrates a flow chart for weight measurement according to one embodiment of the invention. With reference to FIG. 3, measuring the human's weight (208 FIG. 2) is shown in more detail in FIG. 3. The process commences with block 302, wherein a weight measurement is obtained by a weight measurement device. The weight measurement can be obtained in an automatic fashion or the weight measurement can be triggered by human interaction from either the human supported by the support surface or another individual such as a health care worker, family member, etc. The weight measurement is displayed at block 304. A display used to display the weight measurement can be any display suitable to communicate the weight measurement to an observer, such as but not limited to, a mechanical display of numbers, any type of electrical display, such as a light emitting diode display (LED), a liquid crystal display (LCD) a flat panel display, a cathode ray tube (CRT), etc.

With reference to FIG. 3, in one embodiment, the weight measurement is stored at block 308. In one embodiment, block 308 represents storing the weight measurement in a memory of a data processing system. In another embodiment, storing the weight measurement can occur within a memory proximate to or located in the weight measurement device.

The data processing system can include a processor configured to perform a function on the data, such as a mathematical function (addition, division, etc.). Several functions are illustrated in FIG. 3. According to various embodiments of the invention, different functions can be applied to the data; the present invention is not limited to the functions described in FIG. 3. The functions described in FIG. 3 are merely illustrative of several mathematical functions that can be applied to the data. Block 312 performs a function that averages successive data elements. The average function can average successively recorded data elements representing weight measurements of the human seated on the support surface. In one embodiment, a weight measurement device can time average the weight of the human over a predefined time interval. Time intervals can include a user defined time interval, a one second time interval, a one hour time interval, a twelve hour time interval, a twenty four hour time interval, and a number of days.

Data is plotted at block 314. Plotting data can be performed on any device designed to display one or more data elements. Such devices include, but are not limited to, a display device (such as an LED display, LCD display, cathode ray tube (CRT)), a printer, etc. A display device can be located any place on or near the support surface or associated parts. In one embodiment, the display device is located within the field of view of the human seated on the support surface, such as on or near an arm, for example 108 or 110 in FIG. 1. Another location for the display device can be on a stand (not shown) that would position the display in the field of view of the human seated upon the support surface. The stand (not shown) can be mounted on the support surface and in one embodiment can be made to swing or fold out of the way during movement of the support surface. In another embodiment, the display device can be located in any place that is convenient for view by a health care provider, such as on the back portion 104 (FIG. 1), the base 130 (FIG. 1), etc. The present invention is not limited by the location of the display device used to provide information on the weight of the human.

An instantaneous measurement of the weight can be made at block 316. The instantaneous measurement can be plotted as described above, displayed on a display device, etc. In one or more embodiments, measurements can be combined to provide analysis of the human's weight. For example a history of weight over a time interval such as a month can be displayed and a current measure of the human's weight can be over plotted against the history of weight.

Incorporating the weight measurement device into the support surface, on which the human spends a large amount of time, facilitates frequent weight measurement which provides accurate knowledge of the human's weight. Weight measurements made before and after a bowel or urine movement provides a weight of the bowel or urine movement. Monitoring the frequency of the bowel or urine movement, the time of occurrence, and the weight of the discharge (during the bowel or urine movement) can be used as input during medical analysis of the human supported by the support surface.

The functions described above can be incorporated into a weight measurement device or the functions can be distributed across one or more components that are in communication with the weight measurement device. As used in this description, weight measurement device can refer to just a device that obtains a measure of the human's weight or weight measurement device can include additional components, such as a processor, memory, data bus, display, interface(s), etc. needed to perform the functionality described above. In one embodiment, weight measurement device can include a data processing and network system that provides electronic access to the measurement of the human's weight.

In one embodiment, a configuration with wireless network capability utilizing the IEEE 802.11a, IEEE 802.11b, IEEE 802.11X, IEEE 802.15 (Bluetooth) standards (originating in the United States) as well as the HiperLAN standards (originating in Europe) or other wireless communication standards provides wireless connection with and communication of the weight measurement to a monitoring point or to an entity of interest as indicated at block 306. For example, the weight measuring system can be configured to be Bluetooth enabled, utilizing the IEEE 802.15 standard; thereby, providing wireless transmission of the data between two or more locations. The entity of interest can be any person or entity that desires information pertaining to the weight of the human seated on the support surface. In one embodiment, the entity of interest is the health care provider who provides care for the mobility-impaired person. The health care provider can include a nurse, an aid worker, a relative, a nursing home, a hospital, etc. The present invention is not limited by the health care provider or the relationship of the health care provider to the human seated on the support surface.

Figure 4:
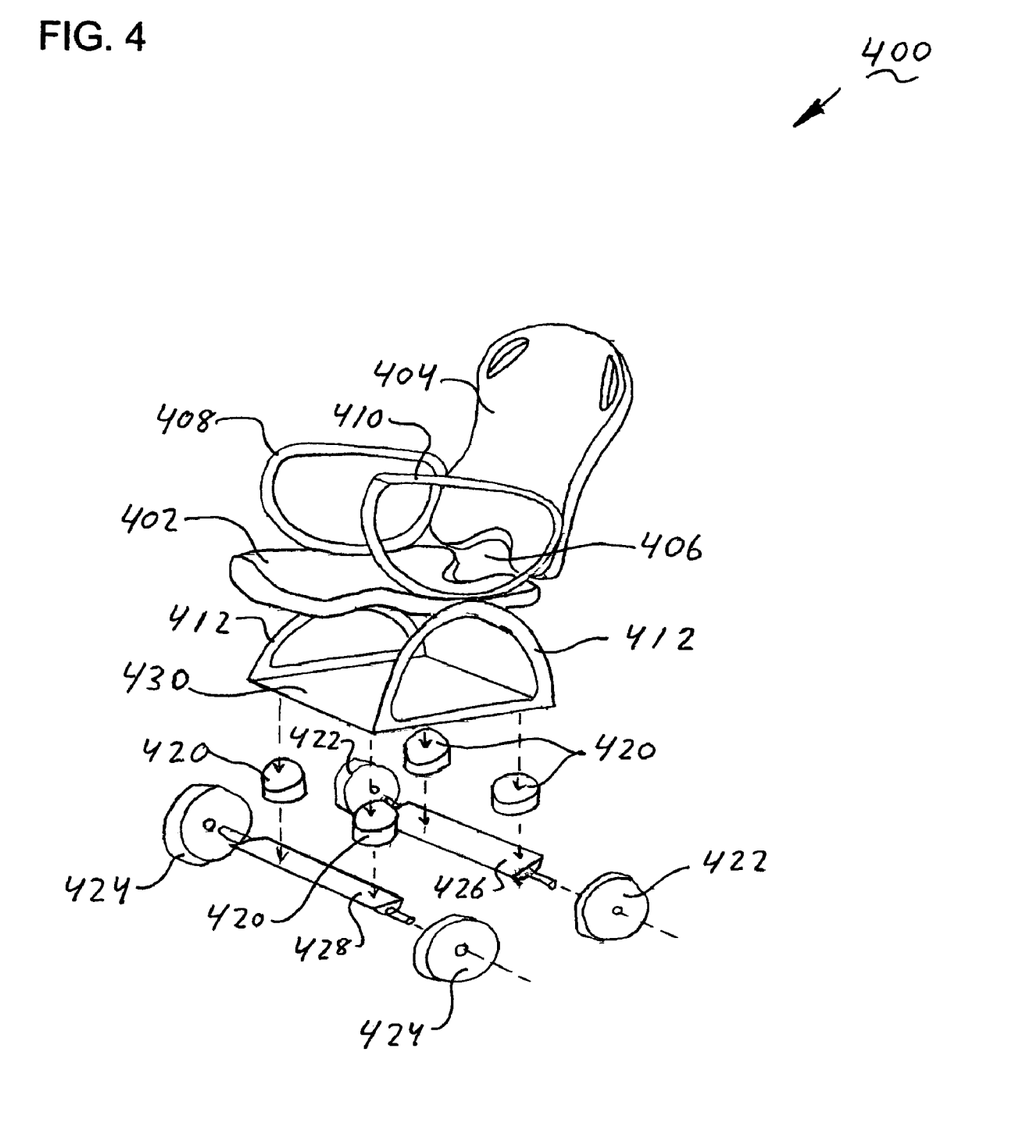
FIG. 4 illustrates an exploded view according to one embodiment of the invention.

FIG. 4 illustrates an exploded view according to one embodiment of the invention. With reference to FIG. 4, a support surface includes a lower portion 402 and a back portion 404. An aperture 406 is defined by the lower portion 402 and the back portion 404. Arms 408 and 410 provide support for the human when the human is supported by the support surface. A frame 412 couples a base 430 to the support surface. In one embodiment the frame 412 can include mechanisms for providing lift such as described above in conjunction with FIG. 1. A foot rest can be included and attached to either the support surface or another part of the assembly to provide stability to the human when the human is seated upon the support surface. In one embodiment, the weight measurement device is distributed across four locations as shown at 420. Alternative arrangements of the weight measurement device will be described below in conjunction with FIG. 5.

In one embodiment, a front axel assembly 428 receives wheels 424 and a rear axel assembly 426 receives wheels 422. The front axel assembly 428 and the rear axel assembly 426 are coupled with the base 430. The wheels 424 and 422 enable the support surface to be moved easily. The support surface can be moved by a health care worker, or by the human seated thereon. In one embodiment, power is provided to rotate and turn the wheels. In one embodiment, an electric motor (not shown) and controls (controls) provide power and directional control. A support surface configured with power and directional control allows a human supported thereon to move about while supported by the support surface.

Many other configurations of assembly are possible. For example, in one embodiment, weight measurement device(s) 420 can be located between frame 412 and the base 430. In another embodiment, the weight measurement device can be incorporated into the frame 412. In one embodiment, the weight measurement device can be made using a strain gauge mounted to the frame 412, such that the strain gauge measures strain in the frame 412 due to the weight of the human supported by the support surface. In another embodiment, the weight measurement device can include one or more individual devices such as indicated by 420, and a weight measurement device can be built into a part of the frame, such as the frame 412. It will be noted that weight measurement devices built into the frame 412 should be incorporated in a symmetric fashion with respect to the left and right sides of the frame. Such symmetric positioning will allow accurate weight measurements of the human to be made irrespective of whether the human is positioned in exactly the same spot when successive measurements of weight are made. It will be noted that such a configuration can be calibrated to provide a weight measurement device that is responsive to the weight of a human supported by the support surface. In another embodiment, the weight measurement device can be located between the support surface and the frame 412. The present invention is not limited by the location of the weight measurement device.

Figure 5:
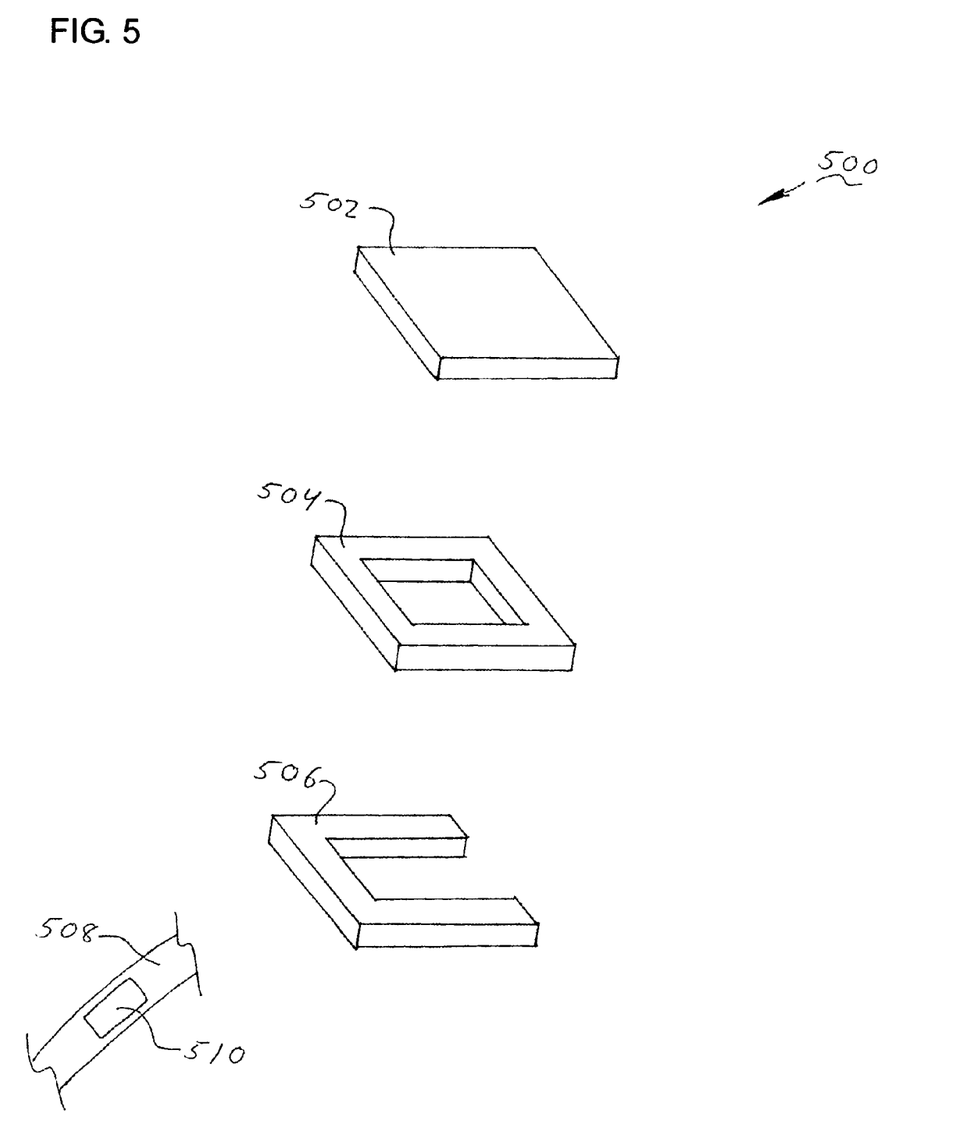
FIG. 5 depicts various shapes of weight measurement devices.

FIG. 5 depicts various shapes of weight measurement devices. With reference to FIG. 5, a number of weight measurement devices are shown generally at 500. A weight measurement device such as 502, 504, and 506 can be a commercially available strain gauge load cell, designed to measure an applied load. In one embodiment, a model PB "WEIGHFER" scale from Cambridge Scale Works Incorporated, with a platform size of 24 inch by 24 inch by 1.5 inch and a weight range of 600 pounds can be used. Such devices produce an electrical signal in response to an applied load. The electrical signal can be displayed on various displays as previously described and processed as previously described. A measuring device such as 502 can be constructed with one or more load cells. Such a device can be used at 120 (FIG. 1) or at 420 (FIG. 4) or a suitably sized device 502 (such as the Cambridge model described above) could extend along the surface area of base 130 (FIG. 1) or base 430 (FIG. 4).

In one embodiment, a portion of a frame is indicated by 508. Such a frame is representative of frame 112 (FIG. 1) or 412 (FIG. 4). A load cell is placed at 510 and secured to frame 508. The load cell produces an output signal in response to an applied load causing a strain in the frame 508. In various embodiments, the load cells shown in FIG. 5 can be used singly or in combination to provide a measurement of the weight of the human when supported by the support surface.

FIG. 6 illustrates support surface adjustment according to one embodiment of the invention. With reference to FIG. 6, a support surface incorporating weight measurement functionality is shown generally at 600. A support surface has a lower portion 602 and a back portion 604; an aperture 606 is defined there between. The lower portion 602 and the upper portion 604 pivot at point 608. In one embodiment, point 608 is an axis of a hinge that connects the lower portion 602 to the back portion 604.

In one embodiment, a frame 630 extends and includes a frame portion 632 and a frame portion 634. The frame 630 can also function as an arm rest for the human. A similar frame (not shown) is positioned on the right hand side of the support surface to provide a symmetric structure. A hinge (not shown) having an axis coincident with pivot point 608 can be supported by a frame member 633. The frame member 633 is coupled with the frame 632, 630, 634. The back portion 604 is releasably coupled to the frame 630 at point 610. Point 610 can be released to allow the back portion to move over a range of motion indicated by arc 614; thereby, permitting the back portion to recline from the position shown. Different ranges of motion, indicated by the arc 614 can be incorporated into different embodiments. No limitation is implied by the range of motion indicated in FIG. 6. The range of motion can be tailored to provide a useful functionality to a support surface that would be desirable for a human supported thereon. A range, such as zero to ninety (90) degrees permits the support surface to be adjusted from an upright position to a horizontal position; thereby, allowing the human to assume a range of postures from upright to prone. The capture function of the support surface is most effective when the lower portion and back portion are sloped as described in the previous figures.

In one embodiment, the lower portion 602 travels through a range of motion as indicated by arc 624. The lower portion is releasably coupled to the frame at point 620. In one embodiment, such adjustability, of the angle of the lower portion 602, allows the lower portion 602 to be adjusted from a negative to a positive slope, where a negative slope is defined to produce a situation where the knees of the human are at an elevation below an elevation of the buttocks of the human supported by the support surface.

In various embodiments, the lower portion 602 and/or the back portion 604 can be configured to be adjusted by one or more motors. The motor(s) can be electric motors that operate a mechanical screw to provide translation or a hydraulic motor and associated hydraulic cylinders can also be configured to provide translation; thereby, facilitating the automatic adjustment of the angle of the lower portion 602 or the angle of the back portion 604. A control can be provided for use by the human so that the lower portion 602 and/or the back portion 604 can be adjusted by the human without the need for assistance.

In one embodiment, the frame portion 632 is configured with an extendable portion 632'. Similarly, frame portion 634 is configured with an extendable portion 634'. Lift functionality is provided as the extendable portion 632' extends relative to 632 and 634' extends relative to 634, thereby, increasing the elevation of the human supported on the support surface a distance indicated by 650. Such elevated positions can be useful when the human supported by the support surface is involved in a variety of activities, including but not limited to, podiatric care, washing, showering, etc. The aperture 606 provides a path for water drainage when the human seated on the support surface is being washed. In one embodiment, the human can be under a flow of water such as under a shower. The aperture prevents water from accumulating and permits the human to dry thereby.

In one embodiment, the frame 630, 632, 632', 634, 634' is configured such that 632' can be extended independently of 634' or 634' can be extended independently of 632'. Such an independent extension of frame portion 634' relative to 634 while the position of 632 and 632' remains fixed, will result in tilting the support surface forward; thereby, helping the human, supported by the support surface to assume a standing position. In one embodiment, the extendable portion 632' can be extended while 634' remains fixed; thereby, facilitating tilting the support surface back. Such reclined positions and/or lift functionality can be useful when the human supported by the support surface is involved in a variety of activities, including but not limited to, podiatric care, washing, showering, etc.

In one embodiment, flexible joints are added to the frame to facilitate the independent lifting functionality described above. In other embodiments, the independent lifting functionality will change the included angle between the lower portion 602 and the back portion 604.

In one embodiment, the frame 632, 630, 634, shown in FIG. 6, can be made out of a tubular metallic member such as aluminum or steel. In one embodiment, a diameter of the tubular metallic member is one and one-half inch and a wall thickness is 0.125 inch. Other cross-sectional shapes can be used for the frame such as a square cross sectional shape and other wall thicknesses can be used, the present invention is not limited by the cross sectional shape or the wall thickness.

In one embodiment, front wheels 646 are provided. Accompanying rear wheels are shown at 648 or the rear wheels can be larger than the front wheels as shown at 644. Larger diameter rear wheels 644 can be sized to allow the human to turn the wheels by hand providing mobility thereby. Power can be provided to the wheels, as described above in conjunction with the previous figures to facilitate movement of the support surface. In one embodiment, power can be provided by an electric motor and drive assembly (not shown).

Figure 7:
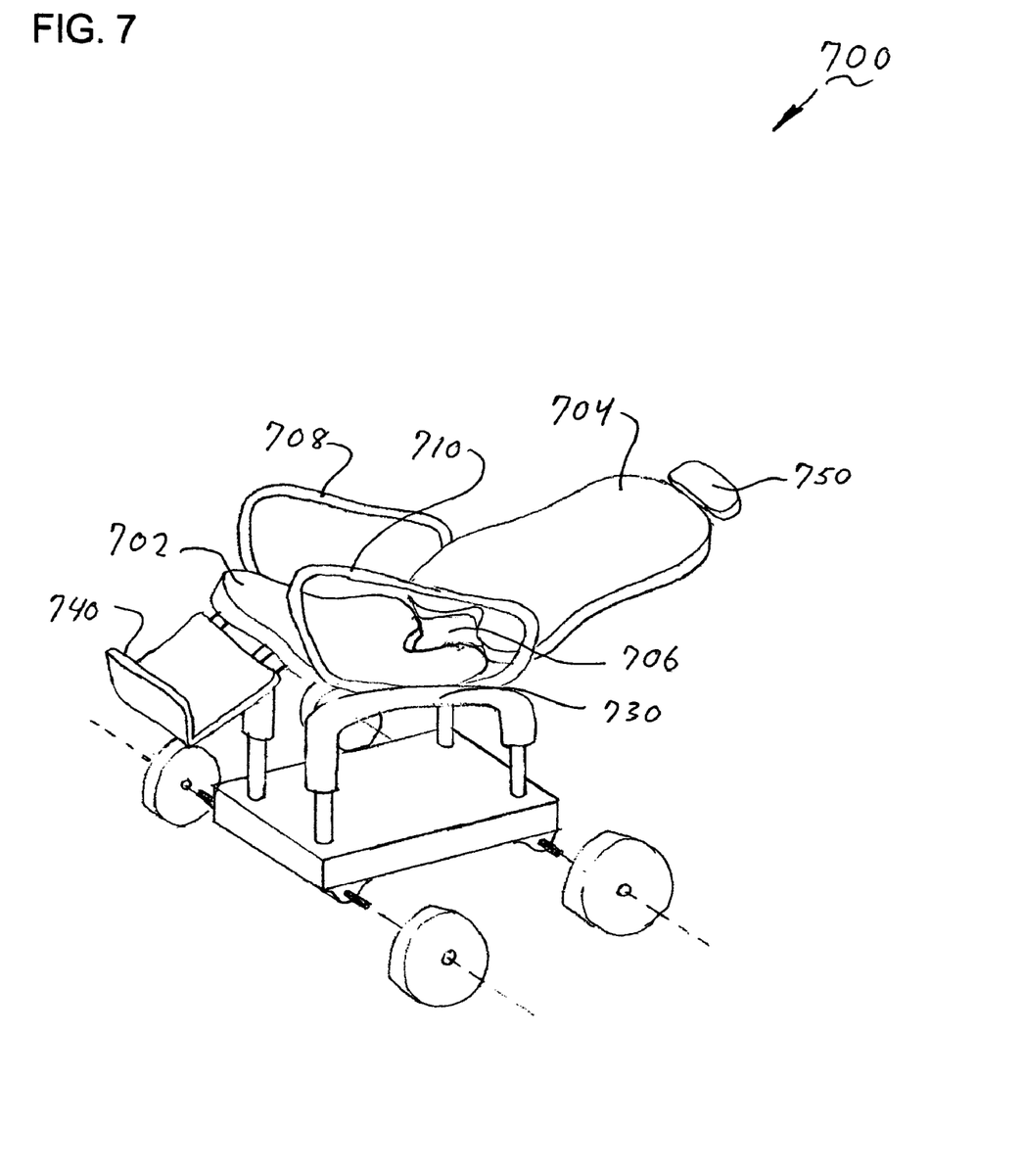
FIG. 7 illustrates one embodiment of the invention depicting a foot rest and lift.

FIG. 7 illustrates one embodiment of the invention depicting a foot rest and lift. With respect to FIG. 7, a reclined orientation is shown generally at 700. A support surface includes a lower portion 702 and a back portion 704. The lower portion 702 and the back portion 704 define an aperture 706. The aperture is located beneath a human's perineum when the human is supported by the support surface. Arms 708 and 710 are coupled to a frame 730 and/or the support surface. The frame 730 can be configured with lift functionality as previously described. A foot rest 740 is coupled with the support surface and/or the frame. A head rest, indicated at 750, can be included to provide support for the human's head when the human is supported by the support surface. Such reclined positions and/or lift functionality can be useful when the human supported by the support surface is involved in a variety of activities, including but not limited to, podiatric care, washing, showering, etc.

A weight measurement device is included to provide a measure of the weight of the human when supported by the support surface. The measurement device can be incorporated as described in conjunction with the figures above.

Figures 8A, 8B:
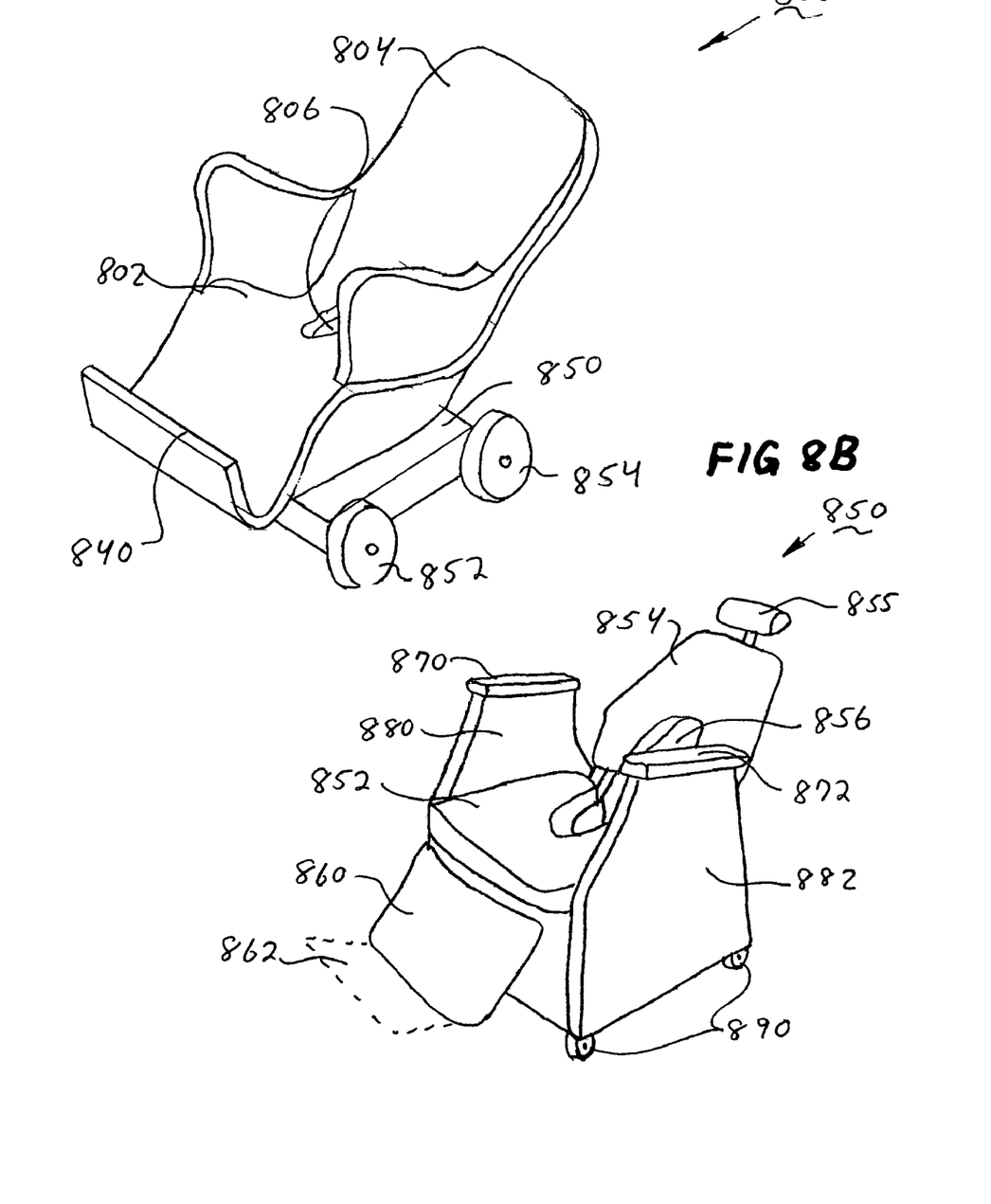
FIG. 8A illustrates an integrated support structure according to one embodiment of the invention.
FIG. 8B illustrates another embodiment of the invention.

FIG. 8A illustrates an integrated support structure according to one embodiment of the invention. With reference to FIG. 8A, an integrated support structure is shown generally at 800. In one embodiment, a support surface is formed into an integrated structure that includes a lower portion 802 and an upper portion 804, an aperture 806 is provided therein.

The aperture is located beneath the human's perineum when the human is supported by the support surface. In one embodiment, a foot rest 840 is formed into the integrated structure. The integrated structure rests on a base 850. The base 850 has wheels 852 and 854 to facilitate mobility of the support surface. In one embodiment, a measurement device is mounted between the integrated structure and the base 850 to provide a measure of the human's weight when the human is supported by the support surface.

FIG. 8B illustrates a support surface with an integrated weight measurement device according to another embodiment of the invention. With reference to FIG. 8B a support surface is shown generally at 850. A support surface includes a lower portion 852 and a back portion 854. An aperture is defined as shown at 856. The aperture is located beneath a human's perineum when the human is supported by the support surface. A head rest 855 is coupled to the back portion 854. The head rest can be adjustably coupled or fixedly coupled with the back portion 854. In one embodiment, the lower portion 852 and/or the back portion 854 are cushions attached to a frame (not completely shown) and the head rest 855 is coupled to the frame.

Sides 880 and 882 are coupled to the support surface. A foot rest 860 is coupled with the support surface. The foot rest 860 can have a portion 862 extending under the feet of the human when the human is supported by the support surface.

An arm rest 870 is coupled with the side 880 and an arm rest 872 is coupled with the side 882. Wheels 890 are coupled with the frame (not shown) and a weight measurement device(s) is incorporated as described in conjunction with the previous figures to provide a measure of the human's weight when the human is supported by the support surface.

Figure 9:
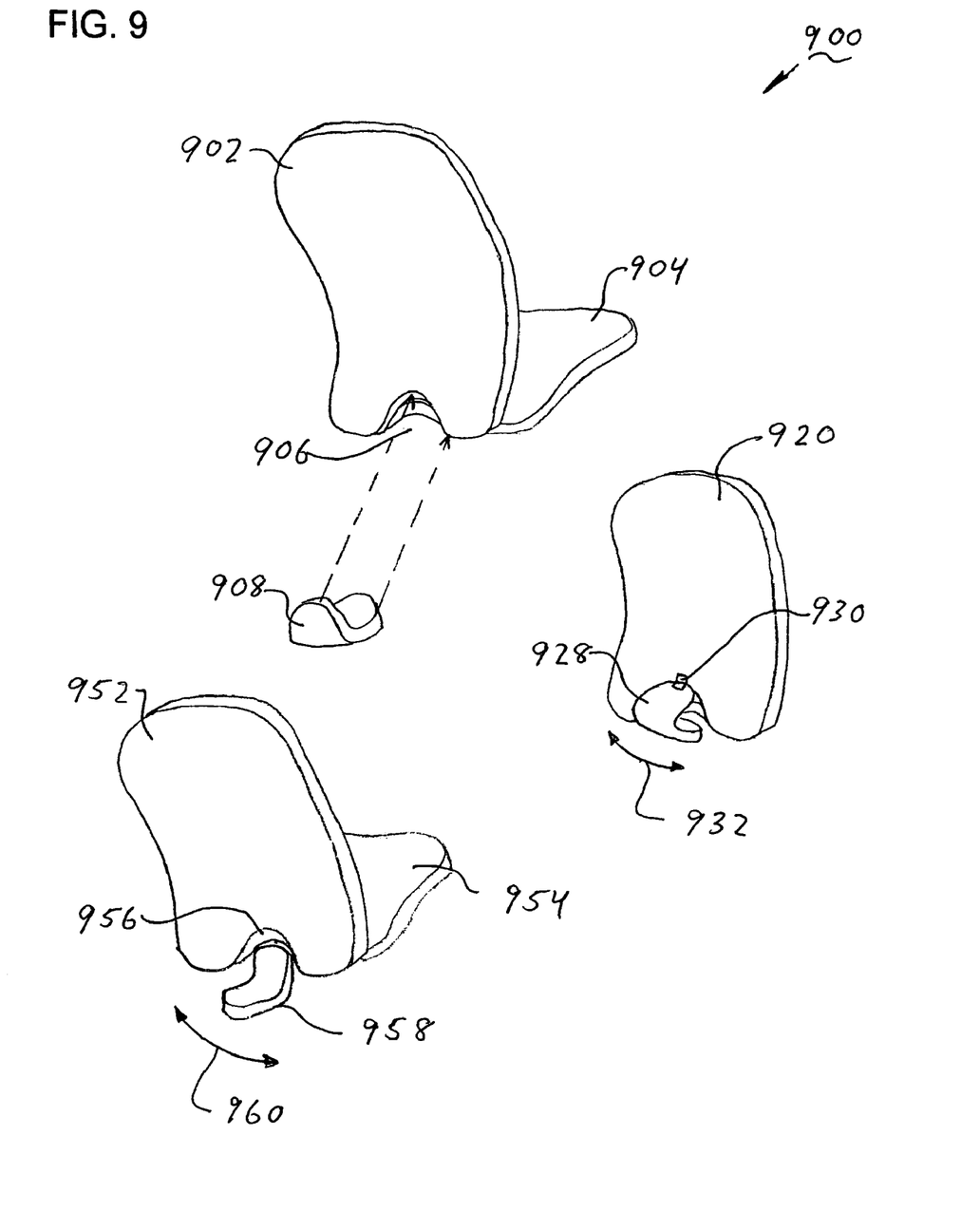
FIG. 9 illustrates an aperture plug according to various embodiments of the invention.

FIG. 9 illustrates an aperture plug according to various embodiments of the invention. With reference to FIG. 9, implementations of an aperture plug are shown generally at 900. In one embodiment, a support surface includes a lower portion 904 and a back portion 902. An aperture is formed in the support surface at 906. The aperture 906 is located beneath a human's perineum when the human is supported by the support surface. An aperture plug 908 is configured to be inserted into the aperture 906. The aperture plug provides additional support to the human's lower anatomy when inserted into the aperture 906. Inserting and removing the aperture plug provide a way of changing the pressure applied to the human's coccyx, sacral, and lower back regions of anatomy.

A change in support and/or additional support for the human's anatomy can make the support surface more comfortable when the human is seated thereon for long periods of time. The aperture plug 908 can be inserted and removed periodically to provide variation of the pressure distribution across the human's buttock, coccyx, sacral, and lower back regions of the human's anatomy. In one embodiment, the aperture plug is constructed to present the same stiffness to the human as does the support surface surrounding the aperture 906. In another embodiment, the aperture plug is constructed to present a decreased stiffness to the human relative to the support surface surrounding the aperture 906. The stiffness of the aperture plug can be made to present an increased stiffness to the human, relative to the stiffness presented by the support surface surrounding the aperture 906; however, such a configuration can generally be perceived as being uncomfortable.

In one embodiment, a back portion of a support surface 920 has an aperture plug 928, movably coupled thereto by a hinge 930. In another embodiment, a support surface has a lower portion 954 and a back portion 952 with an aperture 956. An aperture plug 958 is hingedly coupled to the support surface and is configured to move as indicated by arrow 960.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a support surface for a human, the support surface having a lower portion and a back portion, the lower portion and the back portion having an aperture formed therein, when the human is supported by the support surface the aperture provides a continuous opening that extends from a lower back area downward and anteriorly to a perineal area of the human, the aperture enables a health care worker to access the human's anatomy through the aperture and the aperture relieves pressure over a part of the human's anatomy exposed by the aperture; and
   a weight measurement device coupled with the support surface; such that when the human is supported by the support surface the human's weight can be measured by the weight measurement device.

2. The apparatus of claim 1, further comprising:
   an aperture plug, the aperture plug being removably coupleable with the aperture.

3. The apparatus of claim 2, wherein the aperture plug is hingeadly coupled with the support surface.

4. The apparatus of claim 1, wherein the weight measurement device provides an instantaneous measure of the human's weight.

5. The apparatus of claim 1, wherein the weight measurement device time averages the human's weight.

6. The apparatus of claim 5, wherein an interval used to time average is selected from the group consisting of a predefined interval, a user defined interval, a one second interval, a one hour interval, a twelve hour interval, a twenty four hour interval and a number of days.

7. The apparatus of claim 6, wherein the weight measurement device is selected from the group consisting of a scale, a load cell, a strain gauge load cell, an electrical weight measurement device, an electro-mechanical weight measurement device and a mechanical weight measurement device.

8. The apparatus of claim 1, further comprising:
   data storage to store measurements of the human's weight; and
   a user interface, coupled with the data storage, the user interface configured to display the human's weight.

9. The apparatus of claim 8, further comprising:
   a processor configured to access data from the data storage, the data representing a measurement of the human's weight, and the processor is configured to interact with the user interface.

10. The apparatus of claim 9, wherein the user interface is a data display.

11. The apparatus of claim 9, wherein the processor is configured to perform a mathematical operation on the measurement of the human's weight.

12. The apparatus of clam 1, further comprising:
an arm rest coupled with the support surface, the arm rest is sloped such that an elevation of the human's wrist is greater than an elevation of the human's elbow when the human is seated upon the support surface.

13. The apparatus of claim 1, further comprising:
an arm rest having an adjustable slope.

14. The apparatus of claim 1, wherein the lower portion is sloped such that an elevation of the humans buttocks is less than an elevation of the human's knees when the human is seated upon the support surface.

15. The apparatus of claim 1, further comprising:
a frame coupled with the support surface, the frame is configured to extend and change an elevation of the support surface.

16. The apparatus of claim 1, wherein a slope of the back portion is adjustable.

17. The apparatus of claim 1, wherein a slope of the lower portion and a slope of the back portion can be independently adjusted.

18. The apparatus of claim 1, wherein the support surface, further comprising:
an internal structural component; and
an outer padded layer, the outer padded layer contacts the human when the human rests on the support surface.

19. The apparatus of claim 1, the support surface has a padded layer that contacts the human.

20. The apparatus of claim 1, wherein the lower portion is concave across a width of the lower portion.

21. The apparatus of claim 1, wherein the back portion is concave across a width of the back portion.

22. The apparatus of claim 1, further comprising:
wheels, the wheels are coupled to the apparatus to permit the apparatus to be moved when the human is seated on the support surface.

23. An apparatus comprising:
means for supporting a human, the means for supporting makes contact with the human's legs and back;
means for relieving pressure on a region of the human's anatomy while the human is in contact with the means for supporting, the means for relieving pressure continuously extends from a perineal area posteriorly and up to a lower back area of the human, the means for relieving pressure is not wider than a width of the human's hips; and
means for weighing the human coupled with the means for supporting, such that a weight of the human can be measured by the means for weighing while the human is supported by the means for supporting.

24. The apparatus of claim 23, further comprising:
means for removably eliminating the means for relieving pressure.

25. The apparatus of claim 23, further comprising:
means for averaging the weight.

26. The apparatus of claim 23, further comprising:
means for storing data.

27. The apparatus of claim 23, wherein the means for supporting the human provides for supporting the human's buttocks at a lower elevation than the human's knees.

28. The apparatus of claim 23, wherein the means for supporting provides for supporting the human's elbow at a lower elevation than the human's wrist.

29. The apparatus of claim 23, further comprising:
means for adjusting an elevation of the support surface.

30. The apparatus of claim 23, wherein the means for supporting provides for an adjustable angle of support for the human's torso.

31. The apparatus of claim 23, wherein the means for supporting provides for an adjustable angle of support for the human's legs.

32. The apparatus of claim 23, further comprising:
means for providing mobility to the support surface.

33. The apparatus of claim 23, further comprising:
means for capturing the human.

34. A method comprising:
supporting a human on a support surface;
providing an aperture in the support surface, the aperture exposes a continuous portion of the human's anatomy from a lower back region to a perineal region of the human; and
measuring a weight of the human while the human is seated on the support surface.

35. The method of claim 34, further comprising:
inspecting the human through the aperture in the support surface.

36. The method of claim 34, further comprising:
administering medical care to the human through the aperture in the support surface.

37. The method of claim 34, further comprising:
cleaning the human through the aperture in the support surface.

38. The method of claim 34, further comprising:
washing the human.

39. The method of claim 34, further comprising:
showering the human.

40. An apparatus comprising:
a support surface for a human, the support surface having a lower portion and a back portion, the lower portion and the back portion having an aperture, when the human is supported on the support surface, a continuous portion of the human's anatomy, from lower back to perineum, is exposed by the aperture and the lower portion of the support surface is configured to support the human's knees at an elevation that is greater than an elevation of the human's buttocks; arm rest, the arm rest is mechanically coupled to the support surface and the arm rest is configured to support the human's wrist at an elevation that is greater than an elevation of the human's elbow;
a weight measurement device coupled with the support surface, such that the human's weight can be measured by the weight measurement device; and
wheels coupled with the support surface, such that the apparatus moves when the wheels rotate.

41. The apparatus of claim 40, wherein the weight measurement device is selected from the group consisting of a scale, a load cell, a strain gauge load cell, an electrical weight measurement device, an electro-mechanical weight measurement device and a mechanical weight measurement device.

42. An apparatus comprising:
a support surface configured to support a human, the support surface having a lower portion and a back portion, the lower portion and the back portion defining an aperture, the aperture exposes a continuous portion of the human's anatomy from a lower back area to a perineum when the human is supported by the support surface;

a weight measurement device coupled with the support surface to provide a measurement of the human's weight when the human is supported by the support surface;

a wireless communication interface coupled with the weight measurement device configured to transmit the measurement; and a wireless communication terminal configured for wireless communication with the wireless communication interface, such that the measurement is received by the wireless communication terminal.

43. The apparatus of claim 42, wherein the weight measurement device is selected from the group consisting of a scale, a load cell, a strain gauge load cell, an electrical weight measurement device, an electro-mechanical weight measurement device and a mechanical weight measurement device.

44. An apparatus comprising:
a display device; and
a processor in communication with the display device, the processor is coupled with a communications network, wherein a measure of a human's weight is received from a weight measuring device, the weight measuring device is coupled with a support surface, the support surface is configured to support a human, the support surface having a lower portion and a back portion, the lower portion and the back portion defining an aperture, the aperture exposes a continuous portion of the human's anatomy from a lower back area to a perineum when the human is supported by the support surface.

45. A method comprising:
receiving a measurement of a human's weight, the measurement is obtained from a measuring device, wherein the measuring device is coupled with a support surface, the support surface is configured to support a human, the support surface having a lower portion and a back portion, the lower portion and the back portion defining an aperture, the aperture exposes a continuous portion of the human's anatomy from a lower back area to a perineum when the human is supported by the support surface.

* * * * *